Jan. 28, 1964 B. E. JOHNSON 3,119,602
SLUDGE REMOVAL HOOD AND BONNET ASSEMBLY FOR
A ROTARY POWER-DRIVEN SAW
Filed May 15, 1962 2 Sheets-Sheet 1

INVENTOR:
BERT E. JOHNSON
BY Norman Gerlach
ATT'Y

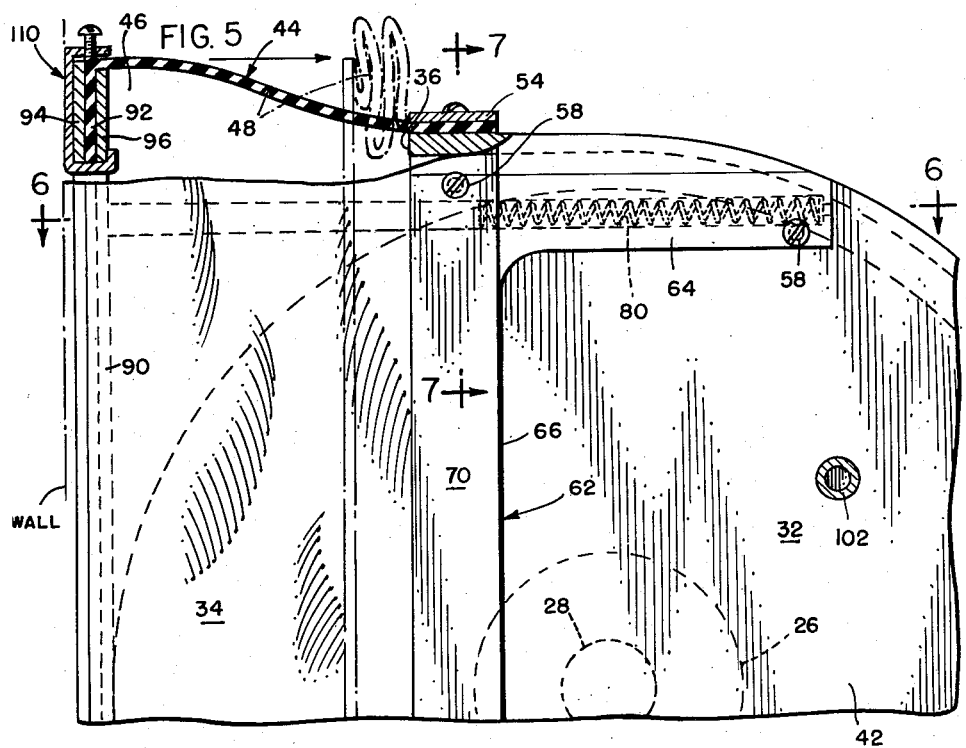
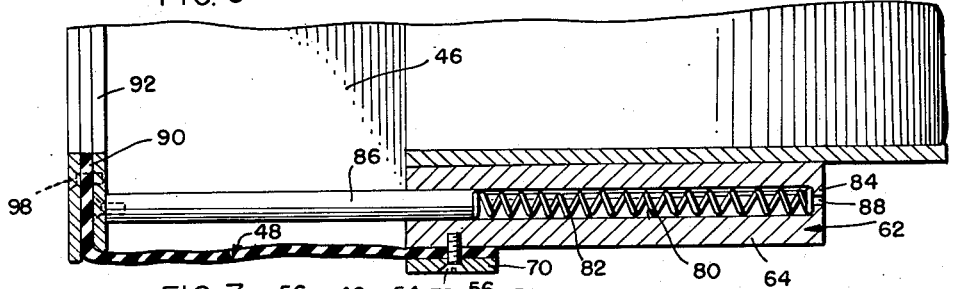
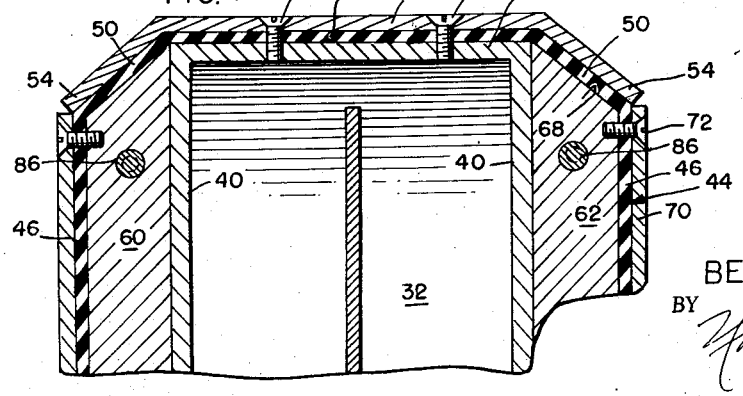

United States Patent Office 3,119,602
Patented Jan. 28, 1964

3,119,602
SLUDGE REMOVAL HOOD AND BONNET ASSEMBLY FOR A ROTARY POWER-DRIVEN SAW
Bert E. Johnson, 4423 N. Sheridan Road, Chicago, Ill.
Filed May 15, 1962, Ser. No. 194,812
1 Claim. (Cl. 262—26)

The improved sludge removal hood and bonnet assembly comprising the present invention has been designed for use primarily in connection with a portable rotary power-driven stone cutting sawing machine of the type which is shown and described in my copending patent application Serial No. 182,296, filed on March 26, 1962, and entitled "Mobile Power-Actuated Concrete Saw With Reaction Supporting Means Therefor," the assembly being applicable to the saw head which is associated with and forms a part of such a machine. The invention is, however, capable of other uses and sludge removal hood and bonnet assemblies constructed in accordance with the principles of the present invention may, with simple and suitable modification, be employed in connection with the saw heads of other types of power-driven sawing machines for the same general purpose, i.e., the sawing of concrete, stone, marble and other materials of a similar nature. It is also contemplated that sludge removal hood and bonnet assemblies embodying the principles of the invention may be employed in connection with concrete surfacing machines which exhibit an abrading function rather than a cutting function. Irrespective, however, of the particular use to which the present invention may be put, the essential features thereof are at all times preserved.

A rotary stone cutting saw of the type which is shown and described in my aforementioned copending patent application is employed principally for cutting horizontal and vertical slits or kerfs in concrete building walls in connection with the creation of doorways or window openings in such walls. It is also used in effecting longitudinal and transverse slits or kerfs in horizontal slabs, such as floor slabs, when it is desired to remove slab sections in order to create openings between superposed building enclosures, for example, preparatory to the erection of a stairway. If a given wall is sufficiently thin, it may be penetrated by a single traversing operation of the saw blade in one direction. If the wall is thick, meeting kerfs may have to be created on opposite sides of the wall.

Diamond rimmed and other saws for cutting concrete and similar materials invariably require the use of large quantities of a liquid coolant (usually water) for proper operation of the saw blades upon the material undergoing sawing. Disposal of the resultant sludge and excess coolant water creates a problem, especially in connection with inside work. Two methods of supplying coolant water to the work undergoing sawing are prevalent. Either the coolant water is directed in the form of a jet or jets against the opposite sides of the rotating saw blade, or the general area where the cut is being effected is flooded with water. If a cut is being made in a vertical wall surface, it is obvious that much of the water will run down the side of the wall and establish an ever-increasing pool of water on the floor beneath the wall, much to the discomfiture of the workman or other occupants of the enclosure. Although most rotary saws of the general character under consideration are equipped with hoods for collecting the sludge and used coolant water as is thrown radially from the periphery of the rotating saw blade, if the cut extends completely through the wall, a large amount of sludge and water is thrown through the cut and into the enclosure on the remote side of the wall. Furthermore, the hood functions merely as a deflector and the water and sludge dripping from or otherwise leaving the same is deposited on the floor surface beneath the area being operated upon. The same general collection of sludge and excess water and the outward flinging thereof also obtain when a cut is being made in a floor slab or other horizontally disposed wall surface.

The present invention is designed to overcome the above-noted limitations that are attendant upon the use of present day portable rotary power-driven saws and, toward this end, it contemplates the provision of a novel hood and bonnet assembly which, when operatively installed upon or incorporated in a saw head, will effectively supply coolant water to and remove excess coolant water and sludge from the area undergoing sawing, removal of such water and sludge being substantially complete in that practically no water or sludge whatsoever escapes from the interior of the assembly, this being the case whether the saw cut is made in a vertical wall surface or in a horizontal wall surface and regardless of the direction of travel of the saw head or, regardless, of whether the saw cut extends completely through the material undergoing sawing or merely extends into the wall in the creation of a kerf.

The provision of a hood and bonnet assembly of the character briefly outlined above being among the principal and general objects of the invention, it is a specific object to provide such an assembly wherein the hood is equipped with both a coolant supply means and a suction means for withdrawing excess water and sludge, and also has associated therewith a novel form of yieldable bonnet which makes sealing engagement with the surface undergoing sawing to seal off an area of the surface in the vicinity of the saw cut, the bonnet being automatically adjustable to accommodate different depths of saw cuts and different thicknesses of materials undergoing sawing, as well as surface undulations or other irregularities in the work undergoing sawing or, in other words, to accommodate different degrees of saw blade penetration into the work.

A still further specific object of the invention is to provide a novel sealing bonnet which, as aforesaid, is yieldable and in which its yieldability is predicated upon the use of compression springs, the springs being completely encased and shielded against contamination by the generated sludge so that there will be no danger of clogging or fouling of these springs and consequent loss of yieldability by the bonnet.

The provision of a sludge removal hood and bonnet assembly which, when the saw head is in its free state, substantially completely encases the associated rotary saw blade and which yields and becomes displaced automatically when the saw blade is applied to the work to permit the necessary degree of saw blade penetration into the work, constitutes another important feature of the present invention.

Numerous other objects and advantages of the invention, not at this time enumerated, will become apparent as the following description ensues.

In the accompanying two sheets of drawings forming a part of this specification, one illustrative embodiment of the invention has been shown.

In these drawings:

FIG. 5 is an enlarged fragmentary sectional view taken substantially along the line 5—5 of FIG. 4;

FIG. 6 is a sectional view taken on the line 6—6 of FIG. 5; and

FIG. 7 is a section view taken on the line 7—7 of FIG. 5.

Figure 1:
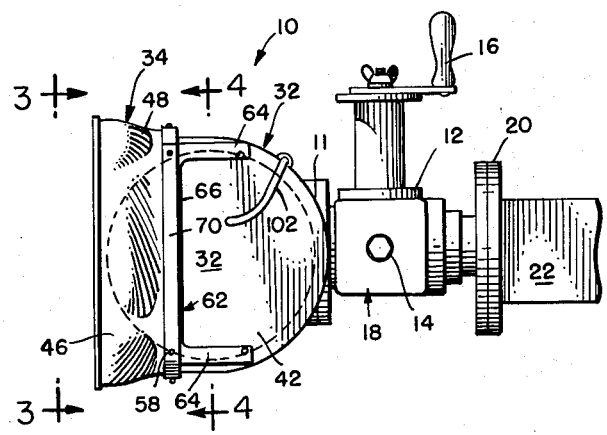
FIG. 1 is a side elevational view of a sludge removal hood and bonnet assembly constructed according to the principles of the present invention and showing the same operatively applied to the saw head of a rotary power-driven sawing machine.

Referring now to the drawings in detail, and in particular to FIGS. 1 to 4, inclusive, a fragmentary portion of a rotary power-driven sawing machine of the general type which is shown and described in my aforementioned patent application has been illustrated in these views, the portion shown including the saw head 10 which traverses the work undergoing sawing, together with the adjacent supporting portion of the machine and also including the means whereby the saw head 10 is caused to travel horizontally when cutting a horizontal slit or kerf. In the drawings, however, the saw head 10 is positioned for vertical sawing and, therefore, it should be understood that the carriage upon which it is mounted (and which will be only briefly described herein) is itself bodily movable vertically.

Reference may be had to the aforementioned application for a full understanding of the nature and operation of the entire rotary sawing machine with which the head 10 is associated but, for purposes of an understanding of the present invention and of the illustrated environment therefor, it may be stated briefly that the saw head 10 is swivelly mounted as at 11 upon a secondary carriage 12 which travels axially along an elongated worm shaft 14 under the motivating influence of an operating handle 16. The worm shaft 14 is carried by a turret structure 18 which is swivelly mounted as at 20 on a primary carriage 22 which is capable of vertical movement under the influence of suitable power-driven mechanism (not shown). The saw head 10 includes a saw frame 24 which supports the spindle bearings 26 for a saw blade spindle 28. A saw blade proper 30 is operatively mounted upon the spindle. A motor M is supported upon the frame 24 and is connected to the spindle 28 in driving relationship. A hood assembly 32 (hereinafter referred to simply as the hood) and an attached bonnet assembly 34 (hereinafter termed the bonnet) are associated with the head 10 and the details of these two assemblies will be made clear presently.

Insofar as the operation of the saw blade 30 is concerned, and disregarding for the moment the function of the hood and bonnet assemblies 32 and 34, vertical cuts or kerfs may be effected in a vertically disposed surface, such as a wall surface, by adjusting the swivel joints 11 and 20 so that the plane of the saw blade 30 extends vertically, advancing the primary carriage 22 and its supported secondary carriage 12 horizontally so that the saw blade 30 enters the work to the desired depth, and finally causing the primary carriage 22 and all the instrumentalities supported thereon to move vertically in the desired direction, i.e., either upwards or downwards. Horizontal cuts or kerfs may be effected in a vertically disposed surface by adjusting the swivel joint 20 so that the axis of the worm shaft 14 extends horizontally, fixing the primary carriage at the desired elevation, adjusting the swivel joint 11 so that the plane of the saw blade 30 is horizontal, advancing the primary carriage and its supported secondary carriage 12 toward the work to attain the desired blade penetration, and then causing the secondary carriage to travel horizontally along the worm shaft 14 in the desired direction. Inclined cuts or kerfs in a vertical surface may be effected as set forth in connection with the production of horizontal cuts or kerfs with the exception that the swivel joint 20 is initially adjusted to cause the secondary carriage 12 to travel along the desired inclined path of movement. Directional cuts or kerfs may be effected in a horizontally disposed floor or ceiling structure by manipulations and operations similar to those heretofore described, it being understood that the swivel joint 11 will be adjusted to swing the hood 32 to a position wherein the bonnet assembly 34 is in operative register with the surface undergoing sawing as will be explained in greater detail presently.

Referring now, additionally, to FIGS. 5, 6 and 7, the hood 32, insofar as its structural details are concerned, exclusive of the coolant supply and sludge removal means, is of more or less conventional design and it is in the form of a sheet metal structure of generally semi-cylindrical configuration having appreciable depth and small transverse width, as best seen in FIG. 7. The hood 32 is of elongated rectangular design in transverse cross section as is also the open rim 36 thereof. One of the two flat side walls 40 of the hood is secured to the frame 24 and the hood partially encompasses the rotating saw blade 30 in the usual manner incident to the use of such hoods, sufficient saw blade projection through the open bell mouth or rim 36 of the hood being provided for, as shown in FIGS. 1 and 5, in order that the rim of the hood will clear the surface undergoing sawing when the maximum depth of the cut is being effected.

The bonnet assembly 34 comprises a generally rectangular flexible tubular sheath 44 which is preferably formed of heavy gauge sheet material of an elastomeric nature, such as rubber, either natural or synthetic, a rubber substitute, a rubberized fabric or the like. This sheath is of a collapsible nature as will be described in more detail presently and it is generally rectangular in transverse cross section throughout most of its entire axial extent. The rear end of the sheath is of slightly smaller size than the size of the forward end thereof and this smaller end is telescopically received over the open rim region of the hood 32 and is effectively clamped thereto by means that also will be described in detail presently.

The flexible tubular sheath 44 is provided with opposed pairs of collapsible side and end walls 46 and 48. At its rear end, the sheath 44 assumes a generally polygonal contour where it is telescopically received over the rim region of the hood, this polygonal contour being shown in FIG. 7, and including four truncated corner sections 50. The end walls 48 of the sheath are clamped to the end walls 52 of the hood by means of clamping strips 54 which fit around the corner sections 50 and are secured in position by screws 56.

Figure 2:
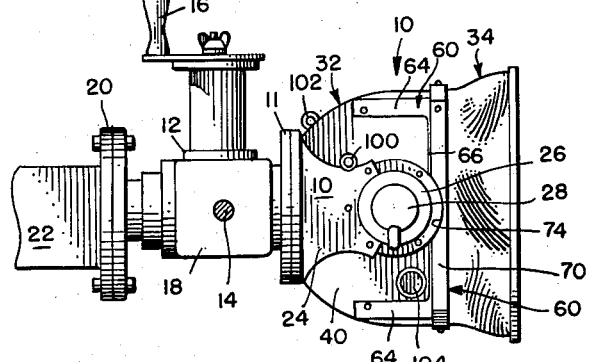
FIG. 2 is a reverse side elevational view of the assembly of FIG. 1.
Figure 3:
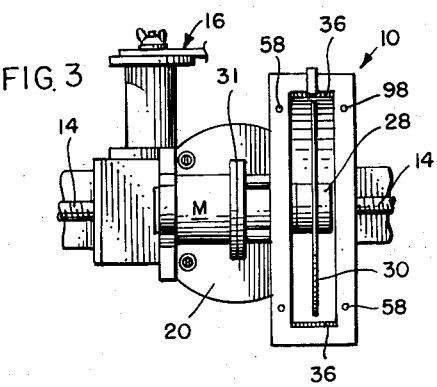
FIG. 3 is an end elevational view of the assembly viewed in the direction indicated by the arrows 3—3 of FIG. 1.

Secured to the side walls 40 of the hood 32 by means of fastening screws 58 are two spring retaining frames 60 and 62. The two frames are similar in their construction and design and each is generally of U-shape configuration and consists of a pair of parallel arms 64 and a connecting bight portion 66. The arms 64 extend generally in a fore-and-aft direction exteriorly of the hood 32 near the opposite ends thereof or, stated otherwise, in adjacent corner regions of the hood, while the bight portions 66 extend vertically along the sides 40 of the hood 32 in the vicinity of the rim 36. These bight portions 66 are trapezoidal in vertical cross section (assuming the head 10 to be positioned as shown in the drawings) and thus they have truncated bevelled end faces 68 (see FIG. 7) which accommodate the truncated corner sections 50 of the sheath 44. Elongated clamping strips 70 and fastening screws 72 serve to clamp the side walls 46 of the sheath against the bight portions 66 of the frames 60 and 62. As shown in FIG. 2, the only difference between the two frames 60 and 62 resides in the provision of a clearance region 74 (see FIG. 2) in the bight portion of the frame 60 for one of the spindle bearings 26.

Each of the arms 64 of the two frames 60 and 62 is formed with a relatively deep socket 80 therein (see FIG. 6), the socket serving to encase a relatively long compression spring 82. One end of each spring 82 bears against the bottom wall 84 of the socket 80 while the other end of the spring bears against the rear end of a plunger 86. The four plungers project forwardly of the rim 36 of the hood and are attached to the corner regions of the flexible sheath 44 in a manner that will be made clear presently. Since there are four of the plungers 86 and since each plunger is secured to one corner region of the flexible sheath 44, the plungers function normally to maintain the sheath in an extended position. The bottom wall 84 of each socket 80 is provided with a small bleeder hole 88 therein so that the plunger and socket may have a mild dashpot action in opposite directions.

As best seen in FIGS. 5 and 6, the forward edge regions of both the side and end walls of the flexible sheath 44 are turned laterally inwardly as shown at 90 and 92, respectively, and are clamped between outer and inner rectangular frames 94 and 96, suitable clamping screws 98 being provided for drawing the two frames toward each other to clamp the inturned portions 90 and 92 securely between the two frames.

Figure 4:
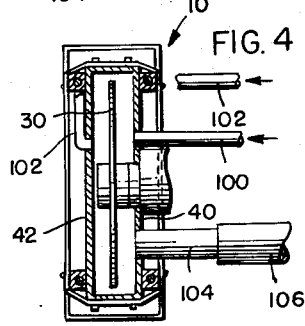
FIG. 4 is a sectional view taken on the line 4—4 of FIG. 3, the saw blade and spindle being shown in elevation.

Means are provided for supplying a liquid coolant, such as water, to the interior of the hood 32, this means taking the form of a pair of coolant supply pipes 100 and 102 (see FIGS. 1, 2 and 4), the pipe 100 communicating with the interior of the hood through one of side walls 40 and serving to direct a jet of water against the adjacent side of the rotating saw blade 30 just outside the hub region thereof, and the pipe 102 passing over the upper region of the hood as shown in FIGS. 1 and 2, and entering the hood through the other side wall 40 at a region directly opposed to the region of entrance to the pipe 100. The two pipes 100 and 102 are adapted to be operatively connected to respective flexible hose lines (not shown) leading from a source of water supply. A sludge removal pipe 104 of appreciable diameter communicates with the lower portion of the interior of the hood through one of the side walls 40, as best seen in FIG. 4, and is adapted to be operatively connected to a flexible hose line, such as the line 106, this latter line, in turn, being operatively connected to a source of subatmospheric pressure which may be the suction side of a centrifugal pump or the like (not shown).

The operation of the sludge removal hood and bonnet assembly of the present invention may conveniently be described in connection with the effecting of a vertical cut or kerf in a vertical wall surface, such as the one represented by the broken vertical line in FIG. 5 and labelled "Wall," inasmuch as the various parts of the rotary stone cutting saw which constitutes the illustrated environment for the assembly are shown as being properly adjusted so that the saw is conditioned for effecting such a vertical cut. It will be understood that the saw framework will be fixedly secured in position adjacent to the wall to be operated upon and the machine carriages 22 and 12 will be advanced toward the wall so that the rotating saw blade 30 will effect an initial entrance into the work. As the saw blade approaches the wall, the outer rectangular frame 94 will engage the wall and the plungers 86 will be forced rearwardly relatively to the frames 60 and 62, thus compressing the springs 82 and partially collapsing the side and end walls 46 and 48 of the flexible elastomeric sheath 44. It will be understood, of course, that the coolant supply pipes 100 and 102 and the suction pipe 104 will be in full operation. In order to prevent a complete seal between the outer frame 94 and the opposed surface of the wall which, due to high suction, might result in inward collapse of the bonnet side and end walls and undue frictional drag upon the traversing movement of the bonnet along the wall, a single C-clamp assembly or offset protuberance 110 is applied to the flat rim of the bonnet, as shown in FIG. 1, so that the rim, which is afforded by the outer frame 94, will be slightly cocked and cannot seat squarely against the wall.

During initial saw blade penetration, the bonnet assembly will thus yield to the forward movement of the saw blade as the latter enters the wall to effect its initial cut. Thereafter, when the saw blade has attained the desired depth of cut and commences to travel upwardly and downwardly along the surface of the wall to create the elongated kerf or cut, the outer rectangular frame 94 will slide upon the face of the wall and maintain the bonnet in its partially collapsed condition. Due to the creation of a partial vacuum within the bonnet confines, there will be a tendency for ambient air to enter the hood and bonnet assembly through the narrow space existing between the frame 94 and the wall surface. This inrush of air will prevent egress of excess coolant water and sludge from beneath the frame. If the cut which is being made by the saw blade 30 extends completely through the wall, there also will be a tendency for air to be drawn into the hood and bonnet assembly through the cut. The inrushing air again will prevent sludge and excess water from being thrown through the cut and into the adjoining enclosure.

The sludge and excess water which is thus prevented from leaving the hood and bonnet assembly is drawn into the suction pipe 104 from whence it may be carried to a point of discharge remote from the area of operations.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claim is the same to be limited.

Having thus described the invention what I claim as new and desire to secure by Letters Patent is:

In a saw head, the combination with a rotary circular saw blade for effecting a cut in a flat wall surface or the like and having a portion of its periphery exposed for cutting, of a rigid hood enclosing the remaining portion of the periphery of the blade and presenting a rectangular open bell mouth surrounding the juncture region between the exposed and the enclosed portions of the blade, a flexible bonnet constituting a forward extension of said bell mouth and comprising a collapsible open-ended bellow-type tubular sheath having its open rear end coextensively secured to said bell mouth in sealing relationship, an elongated rigidifying frame member secured to the open forward end of the sheath, said frame member being engageable with said wall surface and being movable bodily between an extended position wherein it is remote from the mouth of the hood and the sheath is drawn taut thereby, and a retracted position wherein it is in close proximity to said mouth and the sheath is collapsed, yieldable means extending between the hood and frame member for normally urging the frame member to its advanced position, said yieldable means comprising a plurality of plungers having their forward ends connected to the corner regions of the frame member, socket-forming means on said hood providing a guideway for endwise sliding movement of each plunger, and a compression spring disposed within each socket-forming means and serving yieldingly to urge the respective plunger forwardly to in turn individually urge the associated corner region of the frame member forwardly, a coolant supply pipe having one end thereof communicating with the interior of the hood for conducting liquid coolant thereinto, a suction pipe having one end thereof communicating with the interior of the hood for evacuating the hood of excess coolant and sludge resulting from the sawing operations, and an offset protuberance on said frame member on the forward side thereof and engageable with said wall surface for preventing the frame member from seating squarely upon the wall surface during sawing operations.

References Cited in the file of this patent

UNITED STATES PATENTS

| | | |
|---|---|---|
| 1,007,888 | Parker | Nov. 7, 1911 |
| 2,014,222 | Bieling et al. | Sept. 10, 1935 |
| 2,107,552 | Smith | Feb. 8, 1938 |
| 2,122,517 | Curtis | July 5, 1938 |
| 2,306,470 | Rush et al. | Dec. 29, 1942 |
| 2,420,905 | Olsen | May 20, 1947 |
| 2,668,968 | Dobrowolski | Feb. 16, 1954 |
| 2,702,181 | Brown et al. | Feb. 15, 1955 |
| 2,773,337 | De Marchi | Dec. 11, 1956 |
| 2,870,993 | Jahnke | Jan. 27, 1959 |
| 3,034,493 | Bandy | May 15, 1962 |

FOREIGN PATENTS

| | | |
|---|---|---|
| 807,537 | Great Britain | Jan. 14, 1959 |